US010973171B2

(12) United States Patent
Smith et al.

(10) Patent No.: US 10,973,171 B2
(45) Date of Patent: Apr. 13, 2021

(54) SYSTEM AND METHOD FOR MONITORING FIELD PROFILES BASED ON DATA FROM MULTIPLE TYPES OF SENSORS

(71) Applicant: CNH Industrial America LLC, New Holland, PA (US)

(72) Inventors: Kevin M. Smith, Narvon, PA (US); Trevor Stanhope, Darien, IL (US)

(73) Assignee: CNH Industrial America LLC, New Holland, PA (US)

( * ) Notice: Subject to any disclaimer, the term of this patent is extended or adjusted under 35 U.S.C. 154(b) by 176 days.

(21) Appl. No.: 16/162,677

(22) Filed: Oct. 17, 2018

(65) Prior Publication Data
US 2020/0120868 A1 Apr. 23, 2020

(51) Int. Cl.
| A01D 41/127 | (2006.01) |
| G01S 13/88 | (2006.01) |
| G06F 17/18 | (2006.01) |
| A01C 1/00 | (2006.01) |
| G01S 13/86 | (2006.01) |

(52) U.S. Cl.
CPC .............. *A01D 41/127* (2013.01); *A01C 1/00* (2013.01); *G01S 13/86* (2013.01); *G01S 13/88* (2013.01); *G06F 17/18* (2013.01)

(58) Field of Classification Search
CPC .. A01D 41/127; A01D 41/1273; G01S 13/88; G01S 13/86; G06F 17/18; A01C 1/00
USPC .......................................................... 701/50
See application file for complete search history.

(56) References Cited

U.S. PATENT DOCUMENTS

| 6,791,488 B2 | 9/2004 | Diekhans et al. | |
| 6,874,304 B2* | 4/2005 | Clauss | A01D 41/127 460/1 |
| 7,684,916 B2* | 3/2010 | Wei | A01B 69/001 701/50 |

(Continued)

FOREIGN PATENT DOCUMENTS

| WO | WO2012102667 | 8/2012 |
| WO | WO2017158006 | 9/2017 |
| WO | WO2017197292 | 11/2017 |

OTHER PUBLICATIONS

Noyman et al., "Ground surface sensing through plant foliage using an FM-CW radar," Computers and Electronics in Agriculture, vol. 15, Aug. 1, 1996, pp. 181-193.

*Primary Examiner* — Jonathan M Dager
*Assistant Examiner* — Jean W Charleston
(74) *Attorney, Agent, or Firm* — Rebecca L. Henkel; Rickard K. DeMille (57) ABSTRACT

In one aspect, a system for monitoring field profiles may include a vision-based sensor configured to capture vision data indicative of a profile of a field, with the profile being at least of a crop canopy profile of the field or a soil surface profile of the field. The system may also include a secondary sensor configured to capture secondary data indicative of the profile of the field. Furthermore, a controller of the disclosed system may be configured to receive the vision data from the vision-based sensor and the secondary data from the secondary sensor. Moreover, the controller may be configured to determine a quality parameter associated with the vision data. Additionally, when the quality parameter falls below a minimum threshold, the controller may be configured to determine at least a portion of the profile of the field based on the secondary data.

18 Claims, 4 Drawing Sheets

(56) References Cited

U.S. PATENT DOCUMENTS

| | | | |
|---|---|---|---|
| 7,916,898 B2* | 3/2011 | Anderson | A01B 69/008 |
| | | | 250/334 |
| 8,185,275 B2* | 5/2012 | Han | A01B 69/008 |
| | | | 701/50 |
| 8,857,530 B2 | 10/2014 | Henry | |
| 9,030,549 B2 | 5/2015 | Redden | |
| 9,226,490 B2 | 1/2016 | Keye | |
| 9,629,308 B2 | 4/2017 | Schøler et al. | |
| 9,763,437 B2 | 9/2017 | Schnaider et al. | |
| 2007/0003107 A1* | 1/2007 | Wei | G01C 21/00 |
| | | | 382/104 |
| 2013/0180742 A1* | 7/2013 | Wendte | A01B 63/1145 |
| | | | 172/4 |
| 2014/0025264 A1* | 1/2014 | Meagher | A01D 46/082 |
| | | | 701/50 |
| 2016/0316617 A1 | 11/2016 | Leeb et al. | |
| 2017/0049044 A1 | 2/2017 | Stoller et al. | |
| 2017/0172050 A1 | 6/2017 | Henry | |
| 2017/0251587 A1 | 9/2017 | Sporrer et al. | |
| 2017/0251589 A1 | 9/2017 | Tippery et al. | |
| 2018/0124992 A1 | 5/2018 | Koch et al. | |
| 2018/0128933 A1 | 5/2018 | Koch et al. | |
| 2018/0220577 A1* | 8/2018 | Posselius | A01B 79/005 |
| 2018/0325012 A1* | 11/2018 | Ferrari | A01B 69/008 |

\* cited by examiner

SYSTEM AND METHOD FOR MONITORING FIELD PROFILES BASED ON DATA FROM MULTIPLE TYPES OF SENSORS

FIELD OF THE INVENTION

The present disclosure generally relates to agricultural machines and, more particularly, to systems and methods of monitoring the profile of a field being traversed by an agricultural machine based on data received from multiple types of sensors.

BACKGROUND OF THE INVENTION

Agricultural sprayers apply an agricultural substance (e.g., a pesticide, a fungicide, and/or the like) onto crops as the sprayer is traveling across a field. To facilitate such travel, sprayers are configured as self-propelled vehicles or implements towed behind an agricultural tractor or other suitable work vehicle. A typical sprayer includes one or more outwardly-extending booms on which a plurality of spaced apart nozzles is mounted. Each nozzle is configured to dispense or otherwise spray the agricultural substance onto underlying crops and/or weeds.

It is generally desirable that the boom(s) of the sprayer remains level relative to the canopy of the underlying crops to facilitate uniform distribution of the dispensed agricultural substance across the field. As such, some sprayers include one or more actuators that adjust the orientation of the boom(s) relative to the crop canopy based on data received from a sensor. However, various conditions within the field, such as inconsistent crop emergence, terraces or drainage features, dust, spray clouds, poor ambient lighting, and/or the like, may result in low quality sensor data. Such low quality data may, in turn, provide an inaccurate representation of the profile of the underlying crop canopy, thereby resulting in inaccurate and/or unnecessary adjustments of the boom(s).

Accordingly, an improved system and method for monitoring field profiles would be welcomed in the technology. In particular, a system and method for monitoring field profiles based on data from multiple types of sensors would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for monitoring field profiles. The system may include a vision-based sensor configured to capture vision data indicative of a profile of a field, with the profile being at least of a crop canopy profile of the field or a soil surface profile of the field. The system may also include a secondary sensor configured to capture secondary data indicative of the profile of the field. Furthermore, the system may include a controller communicatively coupled to the vision-based sensor and the secondary sensor. The controller may be configured to receive the vision data from the vision-based sensor and the secondary data from the secondary sensor. Moreover, the controller may be configured to determine a quality parameter associated with the vision data. Additionally, when the quality parameter falls below a minimum threshold, the controller may be configured to determine at least a portion of the profile of the field based on the secondary data.

In another aspect, the present subject matter is directed to an agricultural machine. The agricultural machine may include a frame extending laterally between a first side and a second side. The agricultural machine may also include a vision-based sensor positioned on the frame such that the vision-based sensor has a field of view directed toward a portion of a field across which the agricultural machine is traveling. As such, the vision-based sensor may be configured to capture vision data indicative of a profile of the field, with the profile of the field being at least one a crop canopy profile of the field or a soil surface profile of the field. Moreover, the agricultural machine may include a secondary sensor positioned on the frame such that the secondary sensor has a sensor detection range directed toward the portion of the field across which the agricultural machine is traveling. In this regard, the secondary sensor is configured to capture secondary data indicative of the profile of the field. Furthermore, the system may include a controller communicatively coupled to the vision-based sensor and the secondary sensor. The controller may be configured to receive the vision data from the vision-based sensor and the secondary data from the secondary sensor. Moreover, the controller may be configured to determine a quality parameter associated with the vision data. Additionally, when the quality parameter falls below a minimum threshold, the controller may be configured to determine at least a portion of the profile of the field based on the secondary data.

In a further aspect, the present subject matter is directed to a method for monitoring a profile of a field being traversed by an agricultural machine. The agricultural machine may include a vision-based sensor configured to capture vision data indicative of a profile of the field, with the profile being at least one a crop canopy profile of the field or a soil surface profile of the field. The agricultural machine may further include a secondary sensor configured to capture secondary data indicative of the profile of the field. The method may include receiving, with a computing device, vision data from the vision-based sensor and the secondary data from the secondary sensor. The method may also include determining, with the computing device, a quality parameter associated with the vision data. Furthermore, when the quality parameter falls below a minimum threshold, the method may include determining, with the computing device, at least a portion of the profile of the field based on the secondary data. Additionally, the method may include controlling, with the computing device, an operational parameter of the agricultural machine based on the profile of the field.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring field profiles. Specifically, in several embodiments, a controller of the disclosed system may be configured to receive vision data captured by one or more vision-based sensors (e.g., a LIDAR sensor(s), a 3D or stereovision camera sensor(s), and/or the like) mounted on an agricultural machine and secondary data captured by one or more secondary sensors (e.g., a RADAR sensor(s), an ultrasonic sensor(s), a positional sensor(s), and/or the like) mounted on the machine. Furthermore, the controller may be configured to determine one or more quality parameter(s) associated with the captured vision data, with the quality parameter(s) generally being indicative of the accuracy of such data. In the event that the determined quality parameter(s) falls below a minimum threshold, the controller may be configured to determine at least a portion of a profile of the field (e.g., a soil surface profile of the field or a crop canopy profile of the field) based on the secondary data. For example, in one embodiment, when the quality parameter associated with only a portion of the vision data falls below the minimum threshold, the controller may be configured to determine only that portion of the field profile based on the secondary data. However, in another embodiment, when the determined quality parameter(s) falls below the minimum threshold, the controller may be configured to ignore the captured vision data entirely and determine the entire field profile based on the secondary data. Thereafter, the controller may be configured to control one or more operational parameters of the agricultural machine based on the determined field profile. For example, the controller may be configured to adjust the orientation of a frame of the agricultural machine (e.g., one or more booms of a sprayer, a frame of a tillage implement, and/or the like) such that the frame is level relative to the profile of the field or maintains a particular non-level orientation relative to the field (e.g., as defined by the operator of another suitable input).

In several embodiments, the controller may be configured to determine the quality parameter(s) based on the captured vision data. In general, the profile of the field may be expected to vary by no more than a particular amount from one point to the next point along its profile. As such, the controller may be configured to determine an initial profile of the field based on the captured vision data. Moreover, the controller may be configured to determine the quality parameter(s) for the captured vision data corresponding to one or more portions of the initial profile based on the variability of the profile (e.g., the distance between each adjacent pair of points on the initial profile in the longitudinal, lateral, and/or vertical directions). Additionally, the controller may be configured to detect whether a feature in the field is degrading the quality of some portion of the vision sensor's field of view, such as from an occlusion caused by dust, mist/spray, or a section of crop and/or weeds obscuring the part of the expected field of view for the sensor, thereby preventing the disclosed system from detecting the crop canopy profile or soil surface profile beyond the feature. Furthermore, the controller may be configured to remove any portions of the initial profile in which the associated quality parameter falls below the minimum threshold. Thereafter, the controller may be configured to replace any removed portions of the initial profile with substitute portions determined based on the captured secondary data, thereby forming a final profile of the field for use in controlling the operation of the agricultural machine.

Additionally, in one embodiment, the controller may be configured to determine the quality parameter(s) based on the secondary data. In general, when the vision-based sensor(s) is positioned too close to or too far away from the crop canopy or the soil surface of the field, the captured vision data may be of low quality. As such, the controller may be configured to monitor the distance between the vision-based sensor(s) and the crop canopy or the soil surface of the field based on the captured secondary data. Moreover, the captured vision data may be of low quality when the associated agricultural machine is excessively pitched and/or rolled. In this regard, the controller may be configured to monitor the pitch and/or roll of the agricultural machine based on the captured secondary data. Thereafter, the controller may be configured to determine the quality parameter based on the monitored distance or pitch roll. In the event that the determined quality parameter falls below the minimum threshold, the controller may be configured to ignore the vision data and determine the entire profile of the field based on the secondary data.

Figure 1:
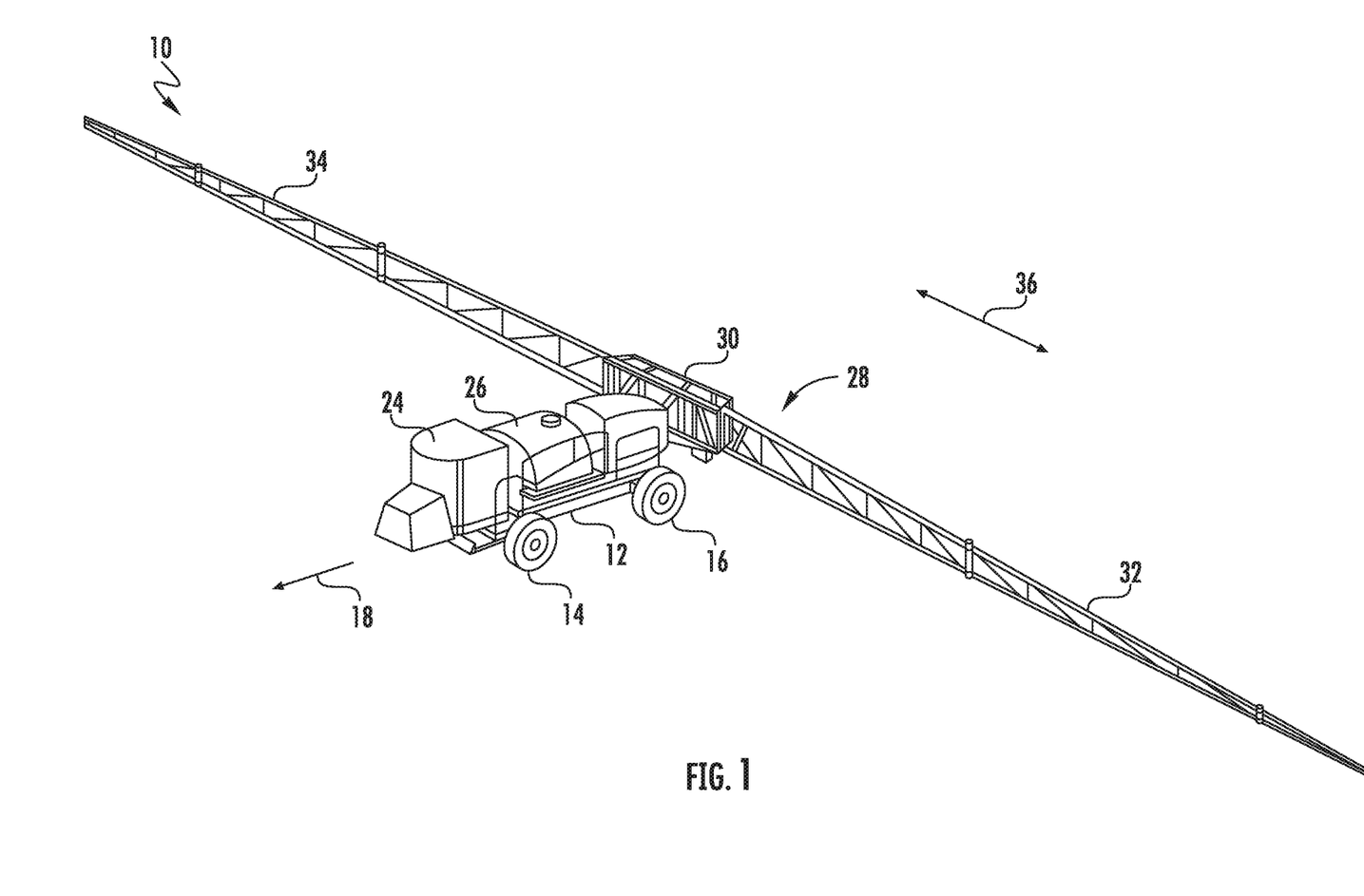
FIG. 1 illustrates a side view of one embodiment of an agricultural machine in accordance with aspects of the present subject matter.

Referring now to FIG. 1, a perspective view of one embodiment of an agricultural machine 10 is illustrated in accordance with aspects of the present subject matter. In the illustrated embodiment, the agricultural machine 10 is configured as a self-propelled agricultural sprayer. However, in alternative embodiments, the agricultural machine 10 may be configured as any other suitable type of agricultural vehicle, such as an agricultural tractor, a harvester, and/or the like. Moreover, in further embodiments, the agricultural machine 10 may be configured as a suitable agricultural implement, such as a tillage implement (e.g., a disc harrow, a cultivator, a ripper, and/or the like), a seed dispensing implement (e.g., a planter, a seeder, and/or the like), a fertilizer dispensing implement (e.g., a side dresser), a strip tiller, a pull-type sprayer, and/or the like.

As shown in FIG. 1, the agricultural machine 10 may include a chassis 12 configured to support or couple to a plurality of components. For example, a pair of steerable front wheels 14 (one is shown) and a pair of driven rear wheels 16 (one is shown) may be coupled to the chassis 12. The wheels 14, 16 may be configured to support the agricultural machine 10 relative to the ground and move the agricultural machine 10 in a direction of travel (e.g., as indicated by arrow 18 in FIG. 1) across a field. In this regard, the agricultural machine 10 may include an engine (not shown) and a transmission (not shown) configured to transmit power from the engine to the wheels 14, 16. Furthermore, the chassis 12 may also support an operator's cab 24 and a tank 26 that is configured to store or hold an agricultural substance, such as a pesticide, a fungicide, a rodenticide, a fertilizer, a nutrient, and/or the like.

Additionally, the agricultural machine 10 may include a frame or boom assembly 28 mounted on the frame 12. As shown, in one embodiment, the boom assembly 28 may include a center boom 30 and a pair of wing booms 32, 34 extending outwardly from the center boom 30 along a lateral direction 36, with the lateral direction 36 extending generally perpendicular the direction of travel 18. As is generally understood, a plurality of nozzles (not shown) mounted on the boom assembly 28 may be configured to dispense the agricultural substance stored in the tank 26 onto the underlying plants and/or soil. However, it should be appreciated that, in alternative embodiments, the boom assembly 28 may include any other suitable number and/or configuration of boom sections, such as more or fewer than three boom sections. Furthermore, it should be appreciated that, in further embodiments, the front wheels 14 of the agricultural machine 10 may be driven in addition to or in lieu of the rear wheels 16.

Figure 2:
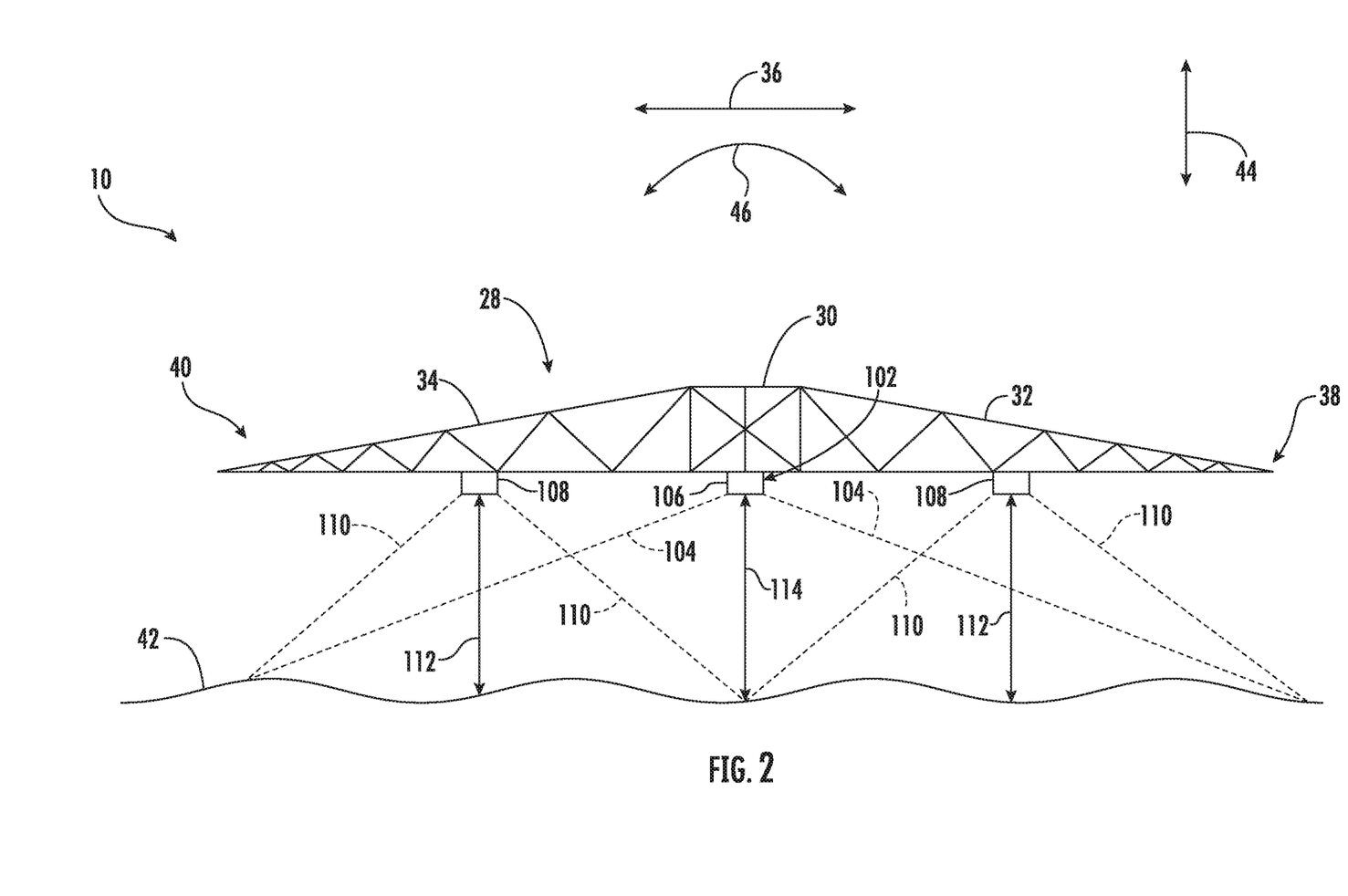
FIG. 2 illustrates a front view of one embodiment of a frame of an agricultural machine in accordance with aspects of the present subject matter.

Referring now to FIG. 2, a front view of one embodiment of the frame or boom assembly 28 of the agricultural machine 10 is illustrated in accordance with aspects of the present subject matter. As indicated above, the boom assembly 28 may extend along the lateral direction 36, such as between a first side 38 of the boom assembly 28 (e.g., the laterally outer end of the wing boom 32) and a second side 40 of the boom assembly 28 (e.g., the laterally outer end of the wing boom 34). Moreover, as shown, the boom assembly 28 may be positioned above or otherwise be spaced apart from a canopy (e.g., as indicated by line 42 in FIG. 2) of the underlying crops along a vertical direction 44, with the vertical direction 44 extending perpendicular to the direction of travel 18 and the lateral direction 36. As will be described below, the position and/or orientation of the boom assembly 28 may be adjusted relative to the crop canopy 42. For example, the boom assembly 28 may be moved up and/or down to adjust the position of the boom assembly 28 relative to the crop canopy 42 along the vertical direction 44. Additionally, the roll of the boom assembly 28 (e.g., as indicated by arrow 46 in FIG. 2) may also be adjusted. It should be appreciated that the roll 46 of the boom assembly 28 may be a differential in the heights of the first and second sides 38, 40 of boom assembly 28 along the lateral direction 36. That is, the boom assembly 28 may be rolled when the one of the first and second sides 38, 40 of the boom assembly 28 is closer to the crop canopy than the other of first and second sides 38, 40 of the boom assembly 28.

In several embodiments, the agricultural machine 10 may include one or more vision-based sensors 102 configured to capture vision data indicative of a profile of the field across which the agricultural machine 10 is traveling. Specifically, in several embodiments, the vision-based sensor(s) 102 may be installed or otherwise positioned on the boom assembly 28. For example, as shown, in one embodiment, a vision-based sensor 102 may be installed on the center boom 30 at a location positioned centrally between the first and second sides 38, 40 of the boom assembly 28 along the lateral direction 36. As such, the vision-based sensor 102 may have a field of view (e.g., as indicated by dashed lines 104 in FIG. 2) directed toward a location underneath and/or in front of the boom assembly 28 relative to the direction of travel 18. In this regard, the vision-based sensor 102 may be able to capture vision data indicative of the profile of the crop canopy 42 within its field of view 104. However, in alternative embodiments, the vision-based sensor(s) 102 may be positioned at any other suitable location(s) on and/or coupled to any other suitable component(s) of the agricultural machine 10, such as at the front of the frame and below the operator's cab 24. Furthermore, it should be appreciated that the agricultural machine 10 may include any other suitable number of vision-based sensors 102, such as two or more sensors 102. Moreover, it should be appreciated that the vision-based sensor(s) 102 may be configured to capture vision data indicative of any other profile associated with the field, such as the profile of the soil surface of the field.

In several embodiments, the vision-based sensor(s) 102 may correspond to a light detection and ranging (LIDAR) sensor(s) 106. In general, each LIDAR sensor 106 may be configured to capture a point cloud of data points within a two-dimensional or three-dimensional space within its field of view 104. For example, in one embodiment, each LIDAR sensor 106 may be configured to capture a point cloud of data points within a plane defined by the lateral and vertical directions 36, 44, with such plane being positioned underneath of or in front of the boom assembly 28. In this regard, the data points may be indicative of the profile of the swath of the crop canopy 42 (e.g., the positions of the top surface of the crop canopy 42) present within the field of view 104 of the associated LIDAR sensor 106. However, in alternative embodiments, the vision-based sensor(s) 102 may correspond to any other suitable type of vision-based sensor(s), such as a 3D or stereovision camera(s).

In accordance with aspects of the present subject matter, the agricultural machine 10 may include one or more secondary sensors 108 configured to capture secondary data indicative of the profile of the field across which the agricultural machine 10 is traveling. Specifically, in several embodiments, the secondary sensor(s) 108 may be installed or otherwise positioned on the boom assembly 28. For example, in one embodiment, one secondary sensor 108 may be installed on the wing boom 32 at a location positioned about two-thirds of the way out to the first side 38 of the boom assembly 28 along the lateral direction 36. Furthermore, another secondary sensor 108 may be installed on the wing boom 34 at a location positioned about two-thirds of the way out to the second side 40 of the boom assembly 28 along the lateral direction 36. As such, each secondary sensor 108 may have a sensor detection range (e.g., as indicated by dashed lines 110 in FIG. 2) directed toward a location underneath, in front of, and/or behind the boom assembly 28 relative to the direction of travel 18. In this regard, each secondary sensor 108 may be able to capture secondary data indicative of the profile of the crop canopy 42 within its field of view 110. Additionally, in one embodiment, the captured secondary data may be indicative of a distance between associated secondary sensor 108 and the crop canopy 42 (e.g., as indicated by arrow 112 in FIG. 2), with such distance(s) 112 generally being indicative of the distance between the vision-based sensor 102 and the crop canopy 42 (e.g., as indicated by arrow 114 in FIG. 2). However, in alternative embodiments, the secondary sensor(s) 108 may be positioned at any other suitable location(s) on and/or coupled to any other suitable component(s) of the agricultural machine 10, such as on the roof of the operator's cab 24 or on the top of the tank 26. Furthermore, it should be appreciated that the agricultural machine 10 may include any other suitable number of secondary sensors 108, such as one sensor 108 or more than two sensors 108. Moreover, it should be appreciated that the secondary sensor(s) 108 may be configured to capture secondary data indicative of any other profile associated with the field, such as the profile of the soil surface of the field. For example, in some embodiments, the secondary sensor(s) 108 may be configured to capture secondary data indicative of the pitch and/or roll of the agricultural machine 10.

Additionally, it should be appreciated that the secondary sensor(s) 108 may generally correspond to any suitable sensing device(s). In several embodiments, each secondary sensor 108 may be configured to emit one or more output signals for reflection off of the crop canopy 42 and/or soil surface profile and receive or sense the return signal(s). For example, in one embodiment, each secondary sensor 108 may correspond to a radio detection and ranging (RADAR) sensor configured to emit one or more radio signals for reflection off of the crop canopy 42. However, in alternative embodiments, the secondary sensor(s) 108 may correspond to an ultrasonic sensor(s) or any other suitable type of sensor(s). Furthermore, the secondary sensor(s) 108 may correspond to a gyroscope(s), an inertial measurement unit(s) (IMU(s)), and/or the like.

Figure 3:
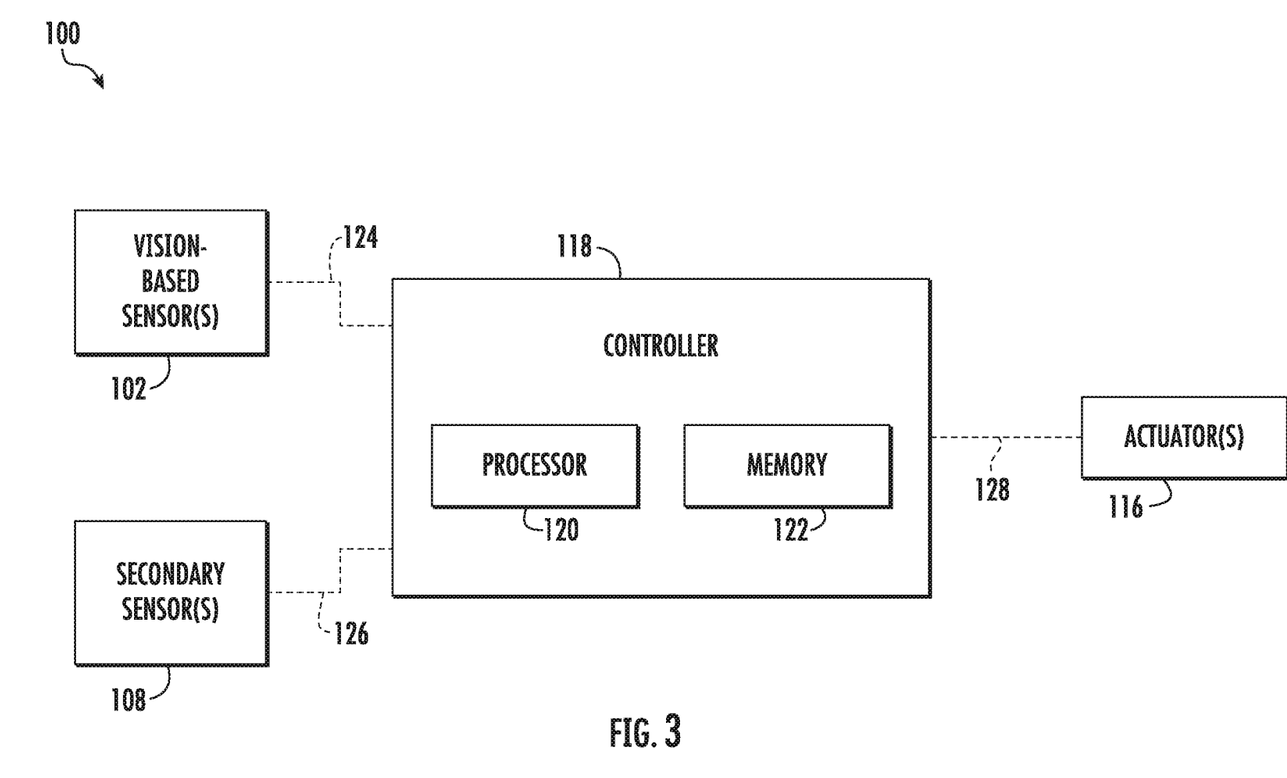
FIG. 3 illustrates a schematic view of one embodiment of a system for monitoring field profiles in accordance with aspects of the present disclosure.

Referring now to FIG. 3, a schematic view of one embodiment of a system 100 for monitoring field profiles is illustrated in accordance with aspects of the present subject matter. In general, the system 100 will be described herein with reference to the agricultural machine 10 described above with reference to FIGS. 1 and 2. However, it should be appreciated by those of ordinary skill in the art that the disclosed system 100 may generally be utilized with agricultural machines having any other suitable machine configuration.

As shown in FIG. 3, the system 100 may include one or more actuators 116 of the agricultural machine 10 that are configured to adjust the position and/or orientation of the boom assembly 28 relative to the field. Specifically, in several embodiments, the actuator(s) 116 may be configured to adjust the position and/or orientation of the boom assembly 28 relative to the crop canopy 42 such that the boom assembly 28 remains level relative to the crop canopy 42. For example, the actuator(s) 116 may be configured to adjust the position of one or more components of the boom assembly 28 (e.g., the wing booms 32, 34) relative to one or more other components of the boom assembly 28 (e.g., the center boom 30) in a manner that adjusts the roll 46 of the boom assembly 28 such that the first and second sides 38, 40 of the boom assembly 28 are equidistant from the crop canopy 42. Furthermore, the actuator(s) 116 may be configured to rotate the boom assembly 28 as a whole relative to the chassis 12 of the agricultural machine 10 to maintain a uniform distance between the first and second sides 38, 40 of the boom assembly 28 and the crop canopy 42. Additionally, the actuator(s) 116 may be configured to raise and/or lower the boom assembly 28 as a whole along the vertical direction 44 relative to the chassis 12 in a manner that adjusts the distance between the boom assembly 28 and the crop canopy 42. In one embodiment, the actuator(s) 116 may be configured as a fluid-driven actuator(s), such a hydraulic or pneumatic cylinder(s). However, in alternative embodiments, the actuator(s) 116 may be configured as any other suitable type of actuator(s), such as electric linear actuator(s).

In accordance with aspects of the present subject matter, the system 100 may include a controller 118 configured to electronically control the operation of one or more components of the agricultural machine 10. In general, the controller 118 may comprise any suitable processor-based device known in the art, such as a computing device or any suitable combination of computing devices. Thus, in several embodiments, the controller 118 may include one or more processor(s) 120 and associated memory device(s) 122 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 122 of the controller 118 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 122 may generally be configured to store suitable computer-readable instructions that, when implemented by the processor(s) 120, configure the controller 118 to perform various computer-implemented functions, such as one or more aspects of the method 200 described below with reference to FIG. 4. In addition, the controller 118 may also include various other suitable components, such as a communications circuit or module, one or more input/output channels, a data/control bus and/or the like.

It should be appreciated that the controller 118 may correspond to an existing controller of the agricultural machine 10 or the controller 118 may correspond to a separate processing device. For instance, in one embodiment, the controller 118 may form all or part of a separate plug-in module that may be installed within the agricultural machine 10 to allow for the disclosed system and method to be implemented without requiring additional software to be uploaded onto existing control devices of the agricultural machine 10.

In several embodiments, the controller 118 may be configured to receive vision data from the vision-based sensor(s) 102 and the secondary data from the secondary sensor(s) 108. Specifically, as shown in FIG. 3, the controller 118 may be communicatively coupled to the vision-based sensor(s) 102 via a wired or wireless connection to allow vision data indicative of the profile of the field (e.g., indicated by dashed line 124 in FIG. 3) to be transmitted from the vision-based sensor(s) 102 to the controller 118. Furthermore, the controller 118 may be communicatively coupled to the secondary sensor(s) 108 via a wired or wireless connection to allow secondary data indicative of the profile of the field (e.g., indicated by dashed line 126 in FIG. 3) to be transmitted from the secondary sensor(s) 108 to the controller 118. In this regard, as the agricultural machine 10 traverses the field, the controller 118 may be configured to receive vision data 124 captured by the vision-based sensor(s) 102 and secondary data 126 captured by the secondary sensor(s) 108. As will be described below, the controller 118 may be configured to determine the profile of the field based on received vision data 124 and the received secondary data 126. Furthermore, the controller 118 may be configured to determine one or more quality parameters associated with the captured vision data 124. As indicated above, various conditions within the field across which the agricultural machine 10 is traveling may impact the quality of the vision data 124 being captured by the vision-based sensor(s) 102. For example, airborne dust, spray clouds, low ambient lighting, and/or the like may reduce the quality or accuracy of the captured vision data 124. As such, the quality parameter(s) may generally provide an indication of the accuracy of the vision data 124 being captured by the vision-based sensor(s) 102. In this regard, the controller 118 may be configured to compare the determined quality parameter(s) to an associated minimum threshold. In the event that the determined quality parameter(s) associated with the vision data 124 for a given swath of the field exceeds the minimum threshold (thereby indicating that the vision data 124 may provide an accurate representation of the profile of such swath of the field), the controller 118 may be configured to determine the profile (e.g., the profile of the crop canopy 42 or the soil surface) of the swath of the based on the received vision data 124. For example, the controller 118 may include one or more suitable algorithms stored within its memory 122 that, when executed by the processor 120, allow the controller 118 to determine the profile of the field based on the received vision data 124. Conversely, in the event that the determined quality parameter(s) associated with the vision data 124 for a given swath of the field falls below the minimum threshold. (thereby indicating that the vision data 124 may provide an inaccurate representation of the profile of such swath of the field), the controller 118 may be configured to determine the profile of the swath of the field at least partially based on the received secondary data 126. For example, the controller 118 may include one or more suitable algorithms stored within its memory 122 that, when executed by the processor 120, allow the controller 118 to determine the profile of the field at least partially based on the received secondary data 126.

It should be appreciated that the controller 118 may be configured to determine any number of quality parameters associated with the captured vision data 124. More specifically, in one embodiment, the controller 118 may be configured to determine a single or overall quality parameter associated with the entire swath of the field present within the field of view 104 of the associated vision-based sensor 102. However, in alternative embodiments, the controller 118 may be configured to determine two or more quality parameters associated with the swath of the field present within the field of view 104 of the associated vision-based sensor 102, with each quality parameter being associated with a different portion the swath. For example, in one embodiment, the controller 118 may be configured to determine one quality parameter associated with the portion of the swath of the field present within the field of view 104 of the vision-based sensor 102 that is also within the sensor detection range 110 of the secondary sensor 108 mounted on the boom wing 32. Moreover, in such embodiment, the controller 118 may be configured to determine a second quality parameter associated with the portion of the swath of the field present within the field of view 104 of the vision-based sensor 102 that is also within the sensor detection range 110 of the secondary sensor 108 mounted on the boom wing 34. However, in alternative embodiments, the determined quality parameters may correspond to any portion of the swath of the field present within the field of view 104 of the vision-based sensor 102.

In several embodiments, the controller 118 may be configured to determine the quality parameter(s) based on the captured vision data 124. In general, the profile of the field may be expected to vary by no more than a particular amount from one point to the next point along its profile. For example, adjacent plants within a field generally experience similar conditions (e.g., soil conditions, temperature, precipitation, and/or the like) such that these plants typically have similar growth characteristics. As such, it is generally expected that the top surface of the crop canopy 42 of adjacent plants is within a certain range of positions. In this regard, the controller 118 may be configured to determine an initial profile of the field (e.g., an initial profile of the crop canopy 42 or the soil surface of the field) based on the captured vision data 124. For example, the controller 118 may include one or more suitable algorithms stored within its memory 122 that, when executed by the processor 120, allow the controller 118 to determine the initial profile of the field based on the received vision data 124. Thereafter, the controller 118 may be configured to analyze the variability of the initial profile of the field and determine the quality parameter(s) associated with the captured vision data 124 based on such variability. In this regard, the controller 118 may include one or more suitable algorithms stored within its memory 122 that, when executed by the processor 120, allow the controller 118 to determine the quality parameter(s) based on the variability of the initial profile. It should be appreciated that any suitable measure of the variability of the initial profile may be used to determine the quality parameter(s). For example, in one embodiment, the distance between each pair of adjacent points (e.g., each pair of adjacent points within the point cloud captured by the LIDAR sensor 106) along the vertical direction 44 may be used to determine the quality parameter(s). However, in alternative embodiments, the controller 118 may be configured to determine the quality parameter(s) based on the captured vision data 124 in any other suitable manner.

In one embodiment, the controller 118 may be configured to replace the portion(s) of the initial profile in which the associated quality parameter(s) falls below the minimum threshold with substitute portions determined based on the received secondary data 126. More specifically, the controller 118 may be configured to remove any portions of the initial profile of the field in which the associated quality parameter(s) falls below the minimum threshold. Furthermore, the controller 118 may be configured to determine substitute portions of the profile of the field based on the received secondary data 126, with such substitute portions corresponding to the removed portions of the initial profile. For instance, the controller 118 may include one or more suitable algorithms stored within its memory 122 that, when executed by the processor 120, allow the controller 118 to determine the substitute portion(s) of the profile based on the captured secondary data 126. Thereafter, the controller 118 may be configured to replace any removed portions of the initial profile with substitute portions to form a final profile of the field. However, in alternative embodiments, the controller 118 may be configured to determine the entire final profile of the field based on the secondary data 126 when quality parameter(s) of one or more portions of the initial profile of the field fall below the minimum threshold.

Furthermore, in one embodiment, the controller 118 may be configured to determine the quality parameter(s) based on the captured secondary data 126. In general, when the vision-based sensor(s) 102 is positioned too close to or too far away from the field (e.g., the crop canopy 42 or the soil surface of the field), the captured vision data 124 may be of low quality. As such, the controller 118 may be configured to monitor the distance 114 between the vision-based sensor(s) 102 and the field (e.g., the crop canopy 42 or the soil surface) based on the captured secondary data 126. Thereafter, the controller 118 may be configured to determine the quality parameter(s) based on the monitored distance 114. Moreover, the captured vision data 124 may be of low quality when the agricultural machine 10 is excessively pitched and/or rolled. As such, in one embodiment, the controller 118 may be configured to monitor the pitch and/or roll of the agricultural machine 10 based on the captured secondary data 126. Thereafter, the controller 118 may be configured to determine the quality parameter(s) based on the monitored pitch and/or roll, in this regard, the controller 118 may include one or more suitable algorithms stored within its memory 122 that, when executed by the processor 120, allow the controller 118 to determine the quality parameter(s) based on the monitored distance 114 or pitch/roll. In the event that the determined quality parameter(s) falls below the minimum threshold, the controller 118 may be configured to ignore the captured vision data 124 and determine the entire profile of the field based on the captured secondary data 126. For example, the controller 118 may include one or more suitable algorithms stored within its memory 122 that, when executed by the processor 120, allow the controller 118 to determine the profile of the field based on the captured secondary data 126.

It should be appreciated that, in some embodiments, the quality parameter(s) may be determined on board the associated sensor 102, 108. More specifically, in such embodiments, the controller 118 may include a central controller and one or more sensor controllers, with each sensor controller positioned on board or otherwise integrated into one of the sensors 102, 108. As such, each sensor controller may be configured to receive vision data 124 or secondary data 126 from the sensing device(s) of the associated sensor 102, 108. The sensor controller(s) may, in turn, process the received data 124, 126 and calculate the associated quality parameter(s). Thereafter, the sensor controller(s) may transmit the determined quality parameter(s) to the central controller.

In one embodiment, the controller 118 may be configured to determine a residue characteristic of the field based on the determined profile of the field. In general, the soil surface profile of the field may be indicative of one or more residue characteristics of the field, such as the percent residue coverage of the field and/or the size and/or presence of residue bunches within the field. As such, the controller 118 may be configured to analyze the determined profile of the soil surface of the field to determine the residue characteristic(s) of the field. For example, the controller 118 may include one or more suitable algorithms stored within its memory 122 that, when executed by the processor 120, allow the controller 118 to determine the residue characteristic(s) based on the profile of the soil surface of the field.

Furthermore, the controller 118 may be configured to determine one or more row structure characteristics and/or weed distribution characteristics for the field based on the determined profile of the field. In general, the determined crop canopy profile of the field may be indicative of one or more row structure characteristic of the field, such as the location and/or profile of the crop rows. Moreover, the determined soil surface profile and/or crop canopy profile of the field may be indicative of the presence and/or distribution of weeds within the field. As such, the controller 118 may be configured to analyze the determined profile of the crop canopy of the field to determine the row structure characteristic(s). The controller 118 may be configured to analyze the determined crop canopy and/or soil surface profiles to determine the weed distribution characteristics) of the field. For example, the controller 118 may include one or more suitable algorithms stored within its memory 122 that, when executed by the processor 120, allow the controller 118 to determine the row structure characteristic(s) and/or weed distribution characteristic(s) based on the profile of the crop canopy and/or soil surface of the field. In alternative embodiments, the row structure characteristic(s) and/or weed distribution(s) may be determined based on raw vision data 124.

In accordance with aspects of the present subject matter, the controller 118 may he configured to control one or more operational parameters of the agricultural machine 10 based on the determined profile of the field. Specifically, as shown in FIG. 3, the controller 118 may be communicatively coupled to the actuator(s) 116 of the agricultural machine 10 via a wired or wireless connection to allow control signals 128 (e.g., as indicated by dashed line 128 in FIG. 3) to be transmitted from the controller 118 to the actuator(s) 116. As such, the controller 118 may be configured to transmit control signals 128 to the actuator(s) 116 instructing the actuators) 116 to adjust the position of the boom assembly 28 or one or more components of the boom assembly 28. For example, in several embodiments, such control signals 128 may be configured to instruct the actuator(s) 116 to adjust the orientation of the boom assembly 28 relative to the field (e.g., the crop canopy 42 or the soil surface of the field) such that the boom assembly 28 is remains level relative to the field (i.e., the first and second sides 38, 40 of the boom assembly 28 are equally distant from the crop canopy 42 or the soil surface). However, in alternative embodiments, the controller 118 may be configured to control any other suitable operational parameters of the agricultural machine 10 based on the determined field profile.

Figure 4:
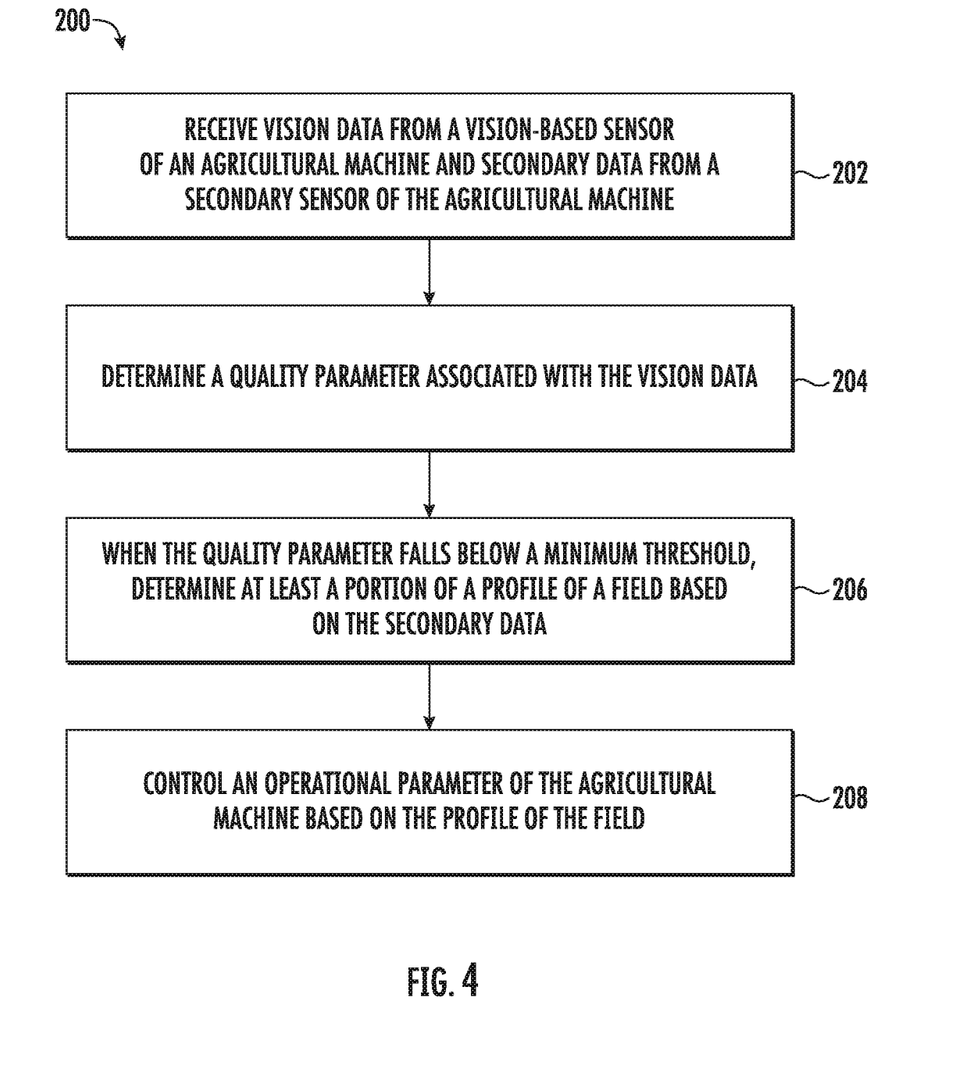
FIG. 4 illustrates a flow diagram of one embodiment of a method for monitoring a profile of a field being traversed by an agricultural machine in accordance with aspects of the present disclosure.

Referring now to FIG. 4, a flow diagram of one embodiment of a method 200 for monitoring a profile of a field being traversed by an agricultural machine is illustrated in accordance with aspects of the present subject matter. In general, the method 200 will be described herein with reference to the agricultural machine 10 and the system 100 described above with reference to FIGS. 1-3. However, it should be appreciated by those of ordinary skill in the art that the disclosed method 200 may generally be implemented with any agricultural machine having any suitable machine configuration and/or any system having any suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include receiving, with a computing device, vision data from a vision-based sensor of an agricultural machine and secondary data from a secondary sensor of the agricultural machine. For instance, as described above, the controller 118 may be communicatively coupled to the vision-based sensor(s) 102 and the secondary sensor(s) 108. In this regard, as the agricultural machine 10 traverses the field, the controller 118 may be configured to receive vision data 124 captured by the vision-based sensor(s) 102 and secondary data 126 captured by the secondary sensor(s) 108.

Additionally, at (204), the method 200 may include determining, with the computing device, a quality parameter associated with the vision data. For instance, as described above, in one embodiment, the controller 118 may be configured to analyze captured vision data 124 to determine one or more quality parameters associated with the captured vision data 124, such as based on the variability of an initial profile of the field determined based on the captured vision data 124. In an alternative embodiment, the controller 118 may be configured to analyze the captured secondary data 126 to determine the quality parameter(s) associated with the captured vision data 124.

Moreover, as shown in FIG. 4, at (206), when the quality parameter falls below a minimum threshold, the method 200 may include, determining, with the computing device, at least a portion of a profile of a field based on the secondary data. For instance, as described above, the controller 118 may be configured to compare the determined quality parameter(s) to an associated minimum threshold. In the event that the determined quality parameter(s) exceeds the minimum threshold(s), the controller 118 may be configured to determine the profile of the field based on the captured vision data 124. Conversely, in the event that the determined quality parameter(s) falls below the minimum threshold(s), the controller 118 may be configured to determine the profile of the field at least partially based on the secondary data 126.

Furthermore, at (208), the method 200 may include controlling, with the computing device, an operational parameter of the agricultural machine based on the profile of the field. For instance, as described above, the controller 118 may be communicatively coupled to the actuator(s) 116. As such, the controller 118 may be configured to transmit control signals 128 to the actuator(s) 116 instructing the actuators) 116 to adjust the orientation of the boom assembly 28 of the agricultural machine 10 such that the boom assembly 28 is remains level relative to the field.

It is to be understood that the steps of the method 200 are performed by the controller 118 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 118 described herein, such as the method 200, is implemented in software code or instructions which are tangibly stored on a tangible computer readable medium. The controller 118 loads the software code or instructions via a direct interface with the computer readable medium or via a wired and/or wireless network. Upon loading and executing such software code or instructions by the controller 118, the controller 118 may perform any of the functionality of the controller 118 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for monitoring field profiles, the system comprising:
a vision-based sensor configured to capture vision data indicative of a profile of a field, the profile being at least of a crop canopy profile of the field or a soil surface profile of the field;
a secondary sensor configured to capture secondary data indicative of the profile of the field; and
a controller communicatively coupled to the vision-based sensor and the secondary sensor, the controller configured to:
receive the vision data from the vision-based sensor and the secondary data from the secondary sensor;
determine a quality parameter associated with the vision data;
determine the profile of the field based on the vision data;
remove a portion of the determined profile of the field in which the quality parameter falls below a minimum threshold; and
determine the removed portion of the profile of the field based on the received secondary data.

2. The system of claim 1, wherein the controller is configured to determine the quality parameter based on the vision data.

3. The system of claim 2, wherein the controller is further configured to determine the quality parameter based on a variability of the determined profile of the field.

4. The system of claim 1, wherein the controller is configured to determine the quality parameter based on the secondary data.

5. The system of claim 4, wherein the controller is further configured to determine a distance between the vision-based sensor and at least one of a soil surface or a crop canopy based on the secondary data, the determined distance corresponding to the quality parameter.

6. The system of claim 4, wherein the controller is further configured to ignore the vision data when the quality parameter falls below the minimum threshold.

7. The system of claim 1, wherein the controller is further configured to control an operational parameter of an agricultural machine based on the determined profile of the field.

8. The system of claim 1, wherein the operational parameter comprises an orientation of a frame of the agricultural machine.

9. The system of claim 1, wherein the controller is further configured to determine at least one of a residue characteristic of the field, a crop row structure characteristic of the field, or a weed distribution characteristic of the field based on the determined profile of the field.

10. The system of claim 1, wherein the vision data is of a different type than the secondary data.

11. The system of claim 1, wherein the vision-based sensor comprises a LIDAR sensor and the secondary sensor comprises at least one of a RADAR sensor or an ultrasonic sensor.

12. An agricultural machine, comprising:
a frame extending laterally between a first side and a second side;
a vision-based sensor positioned on the frame such that the vision-based sensor has a field of view directed toward a portion of a field across which the agricultural machine is traveling, the vision-based sensor configured to capture vision data indicative of a profile of the field, the profile of the field being at least one a crop canopy profile of the field or a soil surface profile of the field;
a secondary sensor positioned on the frame such that the secondary sensor has a sensor detection range directed toward the portion of the field across which the agricultural machine is traveling, the secondary sensor configured to capture secondary data indicative of the profile of the field; and
a controller communicatively coupled to the vision-based sensor and the secondary sensor, the controller configured to:
receive the vision data from the vision-based sensor and the secondary data from the secondary sensor;
determine a quality parameter associated with the vision data;
determine the profile of the field based on the vision data;
remove a portion of the determined profile of the field in which the quality parameter falls below a minimum threshold; and
determine the removed portion of the profile of the field based on the received secondary data.

13. The agricultural machine of claim 12, wherein the controller is further configured to adjust an orientation of the frame based on the determined profile of the field.

14. A method for monitoring a profile of a field being traversed by an agricultural machine, the agricultural machine including a vision-based sensor configured to capture vision data indicative of a profile of the field, the profile being at least one a crop canopy profile of the field or a soil surface profile of the field, the agricultural machine further including a secondary sensor configured to capture secondary data indicative of the profile of the field, the method comprising:
receiving, with a computing device, vision data from the vision-based sensor and the secondary data from the secondary sensor;
determining, with the computing device, a quality parameter associated with the vision data;
determining, with the computing device, the profile of the field based on the vision data;
removing, with the computing device, a portion of the determined profile of the field in which the quality parameter falls below a minimum threshold;
determining, with the computing device, the removed portion of the profile of the field based on the received secondary data; and
controlling, with the computing device, an operational parameter of the agricultural machine based on the profile of the field.

15. The method of claim 14, wherein determining the quality parameter comprises determining, with the computing device, the quality parameter based on the vision data.

16. The method of claim 15,
wherein determining the quality parameter comprises determining, with the computing device, the quality parameter based on a variability of the determined profile of the field.

17. The method of claim 14, wherein determining the quality parameter comprises determining, with the computing device, the quality parameter based on the secondary data.

18. The method of claim 17, further comprising:
determining, with the computing device, a distance between the vision-based sensor and at least one a soil surface or a crop canopy based on the secondary data, the determined distance corresponding to the quality parameter.

* * * * *